(12) United States Patent
Lee et al.

(10) Patent No.: US 9,229,100 B2
(45) Date of Patent: Jan. 5, 2016

(54) PHASED ARRAY RADAR WITH MONOPULSE ALGORITHM MEASUREMENT

(71) Applicant: Toyota Motor Engineering & Manufacturing North America, Inc., Erlanger, KY (US)

(72) Inventors: Jae Seung Lee, Ann Arbor, MI (US); Paul Donald Schmalenberg, Ann Arbor, MI (US); Liping Li, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 267 days.

(21) Appl. No.: 14/033,318

(22) Filed: Sep. 20, 2013

(65) Prior Publication Data

US 2015/0084810 A1    Mar. 26, 2015

(51) Int. Cl.
*G01S 13/44*  (2006.01)
*G01S 7/28*  (2006.01)

(52) U.S. Cl.
CPC .............. *G01S 13/4463* (2013.01); *G01S 7/28* (2013.01)

(58) Field of Classification Search
CPC ........ G01S 7/28; G01S 13/4463; G01S 13/44
USPC ............................................ 342/154, 80, 194
See application file for complete search history.

(56) References Cited

U.S. PATENT DOCUMENTS

| 6,720,908 | B1 | 4/2004 | Puglia |
| 7,212,152 | B2 | 5/2007 | Nagasaku |
| 8,054,216 | B2 | 11/2011 | Kinoshita et al. |
| 2003/0112172 | A1 | 6/2003 | Shinoda et al. |
| 2005/0206556 | A1* | 9/2005 | Isaji ................... G01S 7/354 342/149 |
| 2013/0088381 | A1* | 4/2013 | Puzella ............... G01S 7/032 342/154 |
| 2013/0113651 | A1 | 5/2013 | Leise et al. |
| 2015/0084810 | A1* | 3/2015 | Lee .................... G01S 13/4463 342/154 |

FOREIGN PATENT DOCUMENTS

IT    EP 0096144 A1 * 12/1983    ............ G01S 7/2813
JP    2003232852 A  *  8/2003

OTHER PUBLICATIONS

Brennan, L.E., "Angular accuracy of a phased array radar," Antennas and Propagation, IRE Transactions on , vol. 9, No. 3, pp. 268,275, May 1961.*
Liu Haibo; Yang Xiaoqian; Jiang Han; Sheng Mengmeng, "The study of mono-pulse angle measurement based on digital array radar," Radar Conference 2013, IET International , vol., No., pp. 1,5, Apr. 14-16, 2013.*

* cited by examiner

*Primary Examiner* — John B Sotomayor
(74) *Attorney, Agent, or Firm* — Dinsmore & Shohl LLP (57) ABSTRACT

A phased array radar apparatus and method for identifying targets in an environment includes a phased array radar transmitter, a first phased array radar receiver, a second phased array radar receiver, and a radar controller. The first and second phased array radar receivers are configured such that the first and second phased array radar receivers have effectively the same configuration. The radar controller uses the first and second receive beams to calculate an amplitude monopulse ratio and identify angle information of the targets within the environment. The present invention enables high precision estimation of target angle information while scanning over a wide field of view in a single scan. The radar apparatus further uses a complex amplitude monopulse ratio and a weighted target angle histogram to distinguish between closely separated targets that would otherwise be viewed as a single target by conventional monopulse radar apparatuses.

16 Claims, 5 Drawing Sheets

PHASED ARRAY RADAR WITH MONOPULSE ALGORITHM MEASUREMENT

FIELD OF THE INVENTION

The invention relates to a radar apparatus for identifying targets in an environment using monopulse algorithms. Specifically, monopulse algorithms are implemented on a phased array radar architecture to improve the precision and resolution of angular target measurement.

BACKGROUND OF THE INVENTION

Radar apparatuses are useful to detect the location of targets within an environment. When implemented in automobiles, radar can be utilized in collision avoidance systems, adaptive cruise control, and other vehicle sensor networks. Various radar systems including continuous wave (CW) and pulse radar systems may be used in vehicles and designed according to cost and performance.

Monopulse radar is one such radar system used for detecting the direction of a target. In a known prior art monopulse system, transmitted radar waves are reflected from a target and received by two receiving antennas. The radar controller calculates a sum signal and a difference signal and uses the relation between these two signals to calculate the location of targets within the radar system's field of view. However, as with most radar systems, there are constant tradeoffs between the scan resolution, the angular range of the scan, and the linear range of the scan. Therefore, it would be beneficial to implement the precision angle measurement of a monopulse radar system over a wide field of view. Furthermore, it would be beneficial for the radar system to distinguish between two closely separated targets with a single scan. Finally, the radar system should have a configuration that is compact while maintaining a low manufacturing cost.

SUMMARY OF THE INVENTION

Examples of the present invention include a monopulse radar apparatus for identifying targets in an environment. The apparatus has a phased array radar transmitter and a pair of similarly configured phased array radar receivers that receive the reflected signal generated by the phased array transmitter. The phased array radar transmitter and receivers allow a radar controller to steer both the transmit beam and the receive beams. The first receive beam has a first beam detectable area and the second receive beam has a second beam detectable area in which the first and second phased array radar receivers are able to detect targets. Using the first and second receive beams, the radar controller calculates an amplitude monopulse ratio and identifies angle information of the targets within both the first and second beam detectable areas.

In another embodiment of the present invention, the first and second phased array radar receivers have first and second arrays of receive antenna elements. Each antenna element of the first and second arrays of receive antenna elements has an associated phase shifter. In this way, there is an individual phase shifter for each and every antenna element of the first and second phased array radar receivers. Furthermore, the phased array radar transmitter has an array of transmit antenna elements with each antenna element having an associated phase shifter. As with the first and second phased array radar receivers, each and every antenna element of the array of transmit antenna elements has an individual phase shifter.

In some examples the phased array radar transmitter generates and transmits a plurality of beams into the environment. The first and second phased array radar receivers receive a plurality of receive beams reflected by the targets within either the first beam detectable area or the second beam detectable area. In situations when multiple targets are close to one another the radar controller uses the plurality of first and second receive beams to calculate a weighted target angle histogram along with a complex amplitude monopulse ratio to identify angle information and distinguish between targets within both the first and second beam detectable areas.

In the described examples the radar transmitter and radar receivers are phased arrays having phase shifters for each element of the array. The first and second phased array radar receivers are both configured in a common receiver arrangement so as to perform as two effectively identical phased array radar receivers. This allows the radar controller to use the radar beams received by the first and second phased array radar receivers to perform amplitude monopulse angle detection to estimate a target's angle from a single scan and determine the complex monopulse ratio for the antenna pattern to discriminate between closely separated targets. The phased array radar transmitter antenna array is used to control side lobes and grating lobes. In this way, the present radar system utilizes a radar structure that can be implemented on a single chip with two RF mixers to steer two independent receiving beams to implement monopulse angle detection.

DETAILED DESCRIPTION OF THE INVENTION

Figure 1:
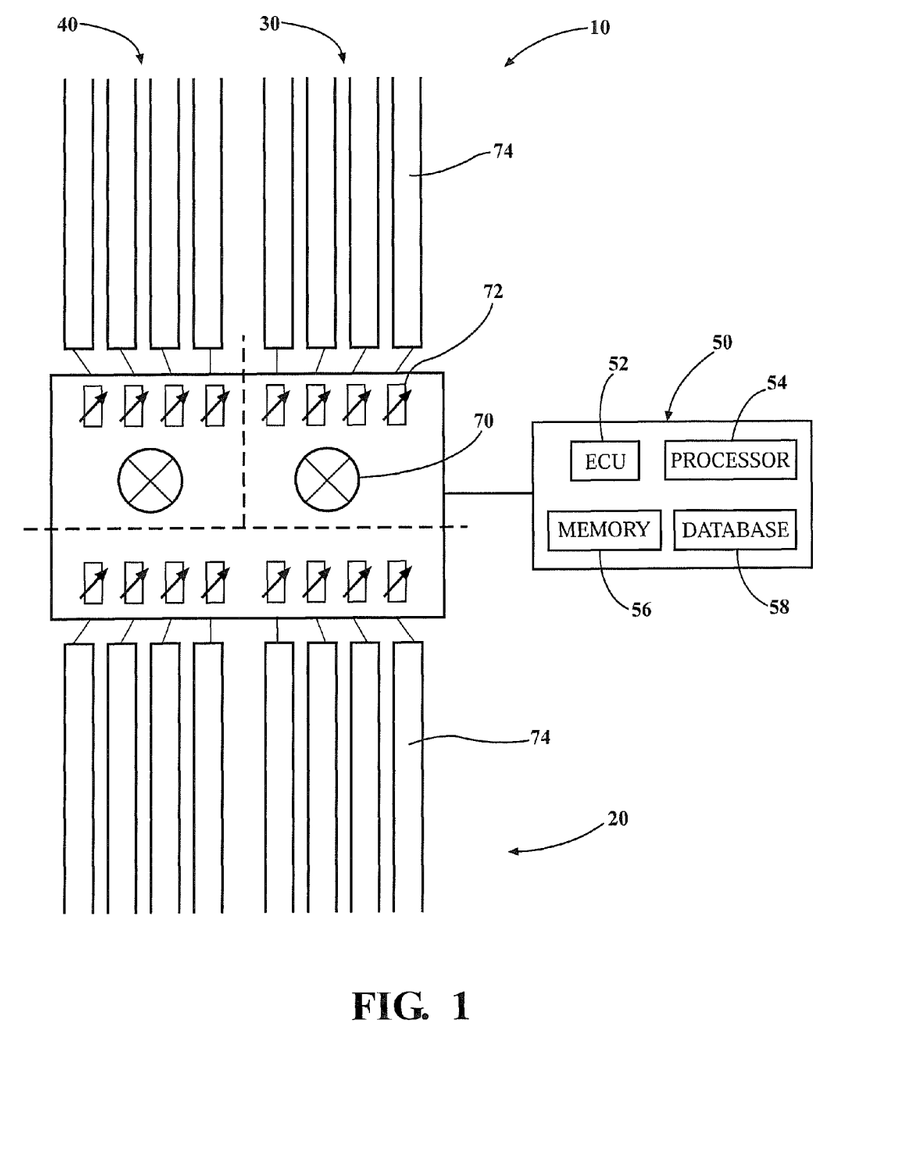
FIG. 1 is an exemplary hardware layout of a phased array radar system.

Examples of the present invention include a radar apparatus 10 for identifying targets 60 in an environment including a phased array radar transmitter 20 which is operable to generate and transmit a transmit beam into the environment. A first phased array radar receiver 30 and a second phased array radar receiver 40 receive beams 32, 42 reflected from the targets 60. The first and second phased array radar receivers 30, 40 are configured in a receiver arrangement so as to effectively perform as two identical phased array radar receivers. Each phased array radar receiver also has a dedicated RF mixer 70 and a set of associated phase shifters 72. Each individual antenna element 74 may further have an associated phase shifter 72, such as a voltage controlled phase shifter. The phased array radar transmitter 20 may also include one or more phased array radar antenna elements 74 each with a set of associated phase shifters 72. Preferably, the radar apparatus 10 is configured so that all the phase shifters 72 and RF mixers 70 are configured in a single RF integrated circuit. The first and second phased array radar receivers 30, 40 are spaced apart so that the phased array radar transmitter 20 is located between the two phased array radar receivers 30, 40. In this configuration, the radar apparatus 10 is able to determine angular information of targets 60 in the environment within the detectable area or field of view 80 of the radar apparatus 10. Specifically, monopulse algorithms are used to determine an azimuth measurement 64 of the targets relative to the radar apparatus 10.

The radar apparatus 10 further has a radar controller 50 which is operable to steer the transmit beam, the first receive beam 32, and the second receive beam 42. The radar controller 50 further has an electronic control unit 52 including a processor 54, memory 56, and an electronic database 58. The radar controller 50 is in communication with the radar transmitter 20 and receiver arrays 30, 40 as is known to one skilled in the art. The radar controller 50 may further be in communication with additional systems that make use of the radar apparatus 10 including adaptive cruise control, environmental sensors, or other general sensors which may be present in a vehicle. In a general sense, the radar apparatus 10 of the present invention integrates with sensor networks to provide information relating towards targets within an environment to the sensor network.

In an example, the phase shifters 72 and mixers 70 for the transmit and receive arrays 30, 40 are all mounted on a single electronic chip. In some examples, the arrays are dynamically reconfigurable, with the number of channels allocated to each array being adjustable. In some examples the radar controller 50 is operable to control the side lobes and grating lobes generated by the phased array radar transmitter 20. In addition, by combining phase shifters 72 for both transmit and receive portions of the radar apparatus 10 onto a single chip, the field of view 80 of the radar apparatus can be extended and the target discrimination is improved, particularly for automotive radar applications.

Figure 7:
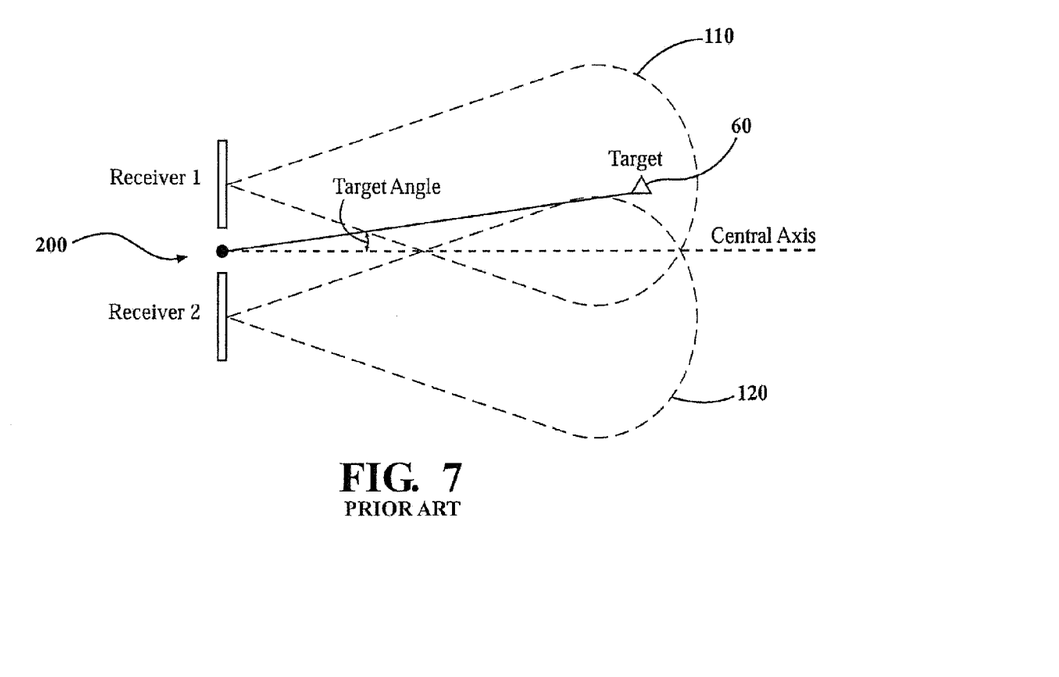
FIG. 7 is an example of a known prior art monopulse radar scan.
Figure 8:
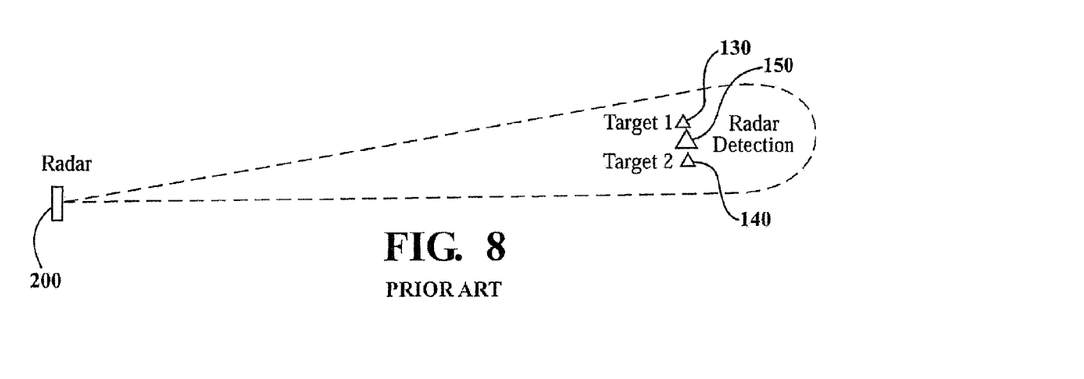
FIG. 8 is an example of a known prior art radar system.

In examples of the present invention, monopulse radar is incorporated with beamforming algorithms for phased array antennas to enable high precision estimation of angle or azimuth information for targets within an environment while scanning over a wide field of view 80. Conventional radar systems 200 make use of monopulse radar technology to estimate angle or azimuth target information; however, the monopulse is usually used to measure the angle from two fixed received beams 110, 120 relative to a central axis. In contrast, in one example the present invention implements amplitude monopulse to estimate target angle from a single scan. In another example, complex monopulse is used to discriminate between two closely separated targets that are located in the same range bin.

Conventional radar systems 200 that make use of monopulse typically have to carry out multiple scans of an environment to obtain a high precision estimation of a target's angle. Specifically, conventional radar systems 200 have to trade off between field of view and scan resolution. For example, many conventional radar systems 200 employ a first scan with a large field of view and low resolution and a second scan with a small field of view and high resolution. In addition, using conventional monopulse techniques, targets that have the same range and velocity and slightly different angles which are less than the radar beamwidth 130, 140 will often be measured as a single target 150 by the conventional radar systems 200. In such conventional radar systems 200, the overall resolution of the system is limited by the radar beamwidth which in turn impacts field of view and overall scan refresh time.

The present radar apparatus 10 overcomes these deficiencies by incorporating beamforming algorithms for phased array antennas with monopulse detection to enable high precision estimation of target angle while maintaining a wide field of view 80. Specifically, using an amplitude monopulse ratio the radar apparatus 10 of the present invention identifies angle information 64 of the targets 60 within the environment from a single scan of the field of view 80. Additionally, in the case where two targets 60 are closely separated and would be identified as a single target by conventional monopulse radar systems 200, the present invention employs a complex amplitude monopulse ratio and a weighted target angle histogram 90 to discriminate between the closely separated targets 60. In this way, the radar apparatus 10 of the present invention offers improved radar performance relative to conventional monopulse radar systems 200.

An example radar includes an RF source, RF amplifiers, RF antenna elements, RF mixers 70, and intermediate frequency (IF) processing stages. Additionally, the example radar apparatus employs an improved approach to beam steering. Employing beam steering, the radar apparatus 10 determines the target angle relative to the location of the radar apparatus. Additionally, the target angle may be measured from the direction of the radar apparatus or other convenient reference point. In other examples, beam steering is achieved using a single chip which includes a plurality of on-chip phase shifters. These phased array steerable beams are formed at both the phased array radar transmitter antennas and the phased array radar receiver antennas.

In some examples, the radar chip has two or more RF mixers 70. Use of multiple RF mixers 70 allows two independent beams to be steered at a time. For example, the receive beams of the first phased array radar receiver 30 and the beams of the second phased array radar receiver 42 may be steered independently of one another. For example, the present radar apparatus uses dual beam steering to steer the receive beams of the first and second phased array radar receivers 30, 40 to focus on a common target 60. Further, example configurations allow problems associated with grating lobes to be eliminated.

In some configurations, the transmitter 20 emits radar waves over a wide field of view 80, and the appearance of a grating lobe in the receive beams 32, 42 limits the radar's field of view 80. However, the effects of the grating lobe can be substantially eliminated by using a phased array on both the transmit and receive beams. The grating lobe effects can be removed without sacrificing beam quality, increasing the usable field of view 80 of the radar.

The first phased array radar receiver 30 and the second phased array radar receiver 40 are configured so as to have the same arrangement and perform as if both receivers 30, 40 were functionally identical. One skilled in the art will appreciate that describing the first and second phased array radar receivers 30, 40 as identical to one another means that the receivers are functionally identical and generate the same response when provided the same input. For example, if the first phased array receiver 30 received a test signal at a set angle and generated a test response, the second phased array receiver would generate the same test response upon receiving the same test signal at the same set angle. One skilled in the art will further appreciate that when designing phased array radar receivers 30, 40 for the radar apparatus 10, the receivers 30, 40 would preferably have similar antenna size, antenna shape, array size, or other properties known by one skilled in the art to influence antenna performance. In this way, the first and second phased array radar receivers 30, 40 both have the same arrangement such that they function as two identical radar receivers.

Figure 2:
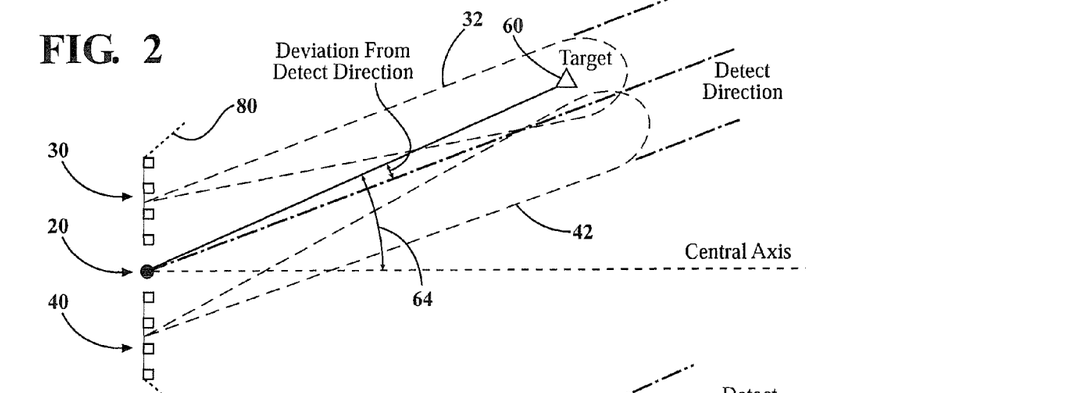
FIG. 2 is an example of the operation of the phased array radar system.
Figure 3:
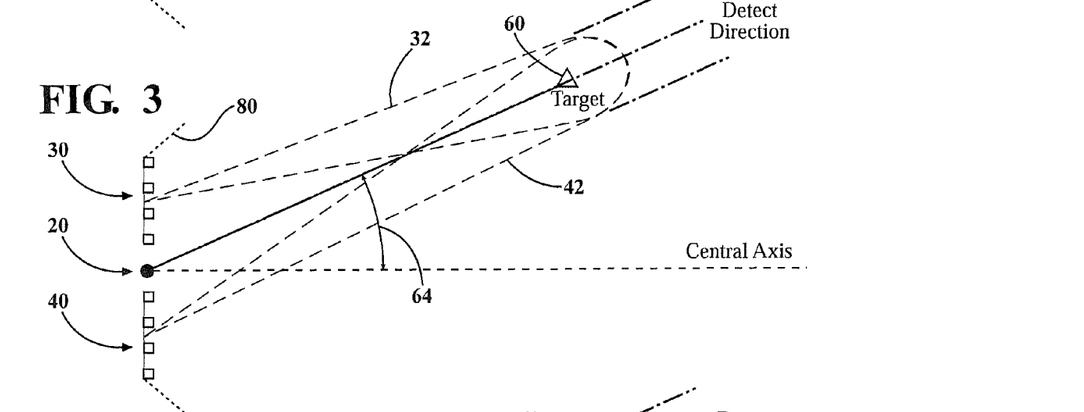
FIG. 3 is an example of the operation of the phased array radar system.

The amplitude monopulse ratio algorithm is used to estimate the target angle 64 relative to the radar apparatus 10. Utilizing the two phased array radar receivers 30, 40, the radar controller 50 forms beams 32, 42 that point in slightly different directions relative to the axis of the transmit beam generated by the phased array radar transmitter 20. In one example, the transmit beam points generally towards the target 60 in the environment. For each beam transmitted in the detect direction, receiving beam patterns from the first receive beam R1 and the second receive beam R2 are received by the first and second phased array radar receivers 30, 40. When the target 60 lies in both the first beam detectable area and the second beam detectable area, the received signal amplitude of the first receive beam R1 and the second receive beam R2 is used by the radar controller to calculate the amplitude monopulse ratio of the target. The pattern's monopulse ratio in that direction is then analyzed to identify angle information of the targets 60 in that direction. The amplitude monopulse ratio algorithm is generally defined as:

$$\text{Pattern Amplitude Monopulse Ratio} = (|R2| - |R1|)/(|R2| + |R1|)$$

$$\text{Target Amplitude Monopulse Ratio} = (|yR2| - |yR1|)/(|yR2| + |yR1|)$$

where
R1=beamforming response pattern in a certain direction from receiving beam 1;
R2=beamforming response pattern in a certain direction from receiving beam 2;
yR1=detected targets response in a certain direction from receiving beam 1;
yR2=detected targets response in a certain direction from receiving beam 2.

By finding the corresponding angle deviation at which the target amplitude monopulse ratio equals the value of the pattern amplitude monopulse ratio, the radar controller 50 identifies angle information of the targets 60 by combining the detection direction with the monopulse deviation. Utilizing this amplitude monopulse algorithm, indentifying angle information of the targets 60 in the field of view 80 only requires a single scan, rather than multiple scans of the environment. In this way, the monopulse radar apparatus 10 of the present invention significantly improves the refresh rate of the system scan and allows for the implementation of more sophisticated target tracking methods such as track-while-scan based on the detection speed.

Figure 4:
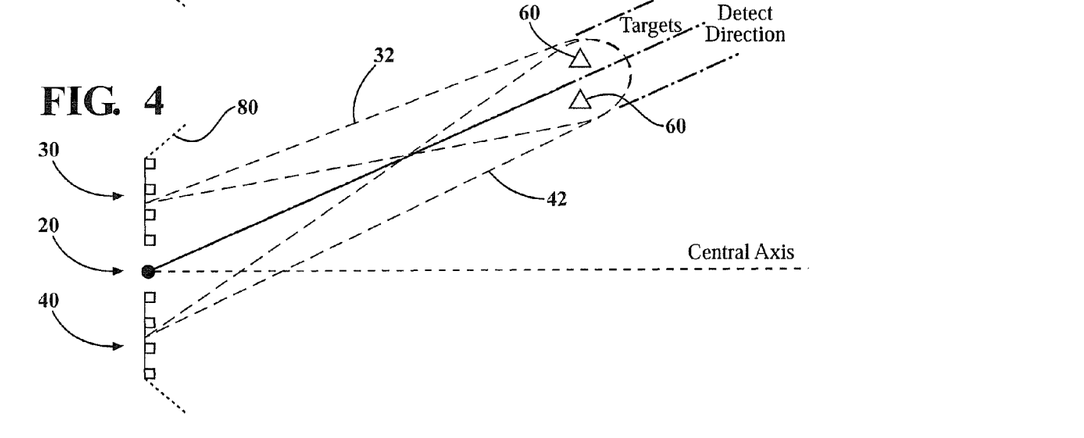
FIG. 4 is an example of the operation of the phased array radar system.

As shown in FIG. 4, in situations where the targets 60 are so closely separated so as to appear in the same range bin to conventional monopulse radar systems 200, the radar controller 50 employs a complex amplitude monopulse ratio and a weighted target angle histogram 90 to identify angle information of the targets 60 within the environment. For example, in conventional monopulse radar systems 200 such as FIG. 8, the radar half power beamwidth of the receiving array beams is usually over 10 degrees which means that it may be difficult to utilize conventional angle measurements to discriminate between targets 130, 140 that are detected by only one beam (less than one beamwidth). In these situations, if two targets 130, 140 have the same range and velocity, with slightly different angles less than the beamwidth from the radar's perspective, they will be measured as a single target 150 by the conventional monopulse radar system 200.

Figure 5A:
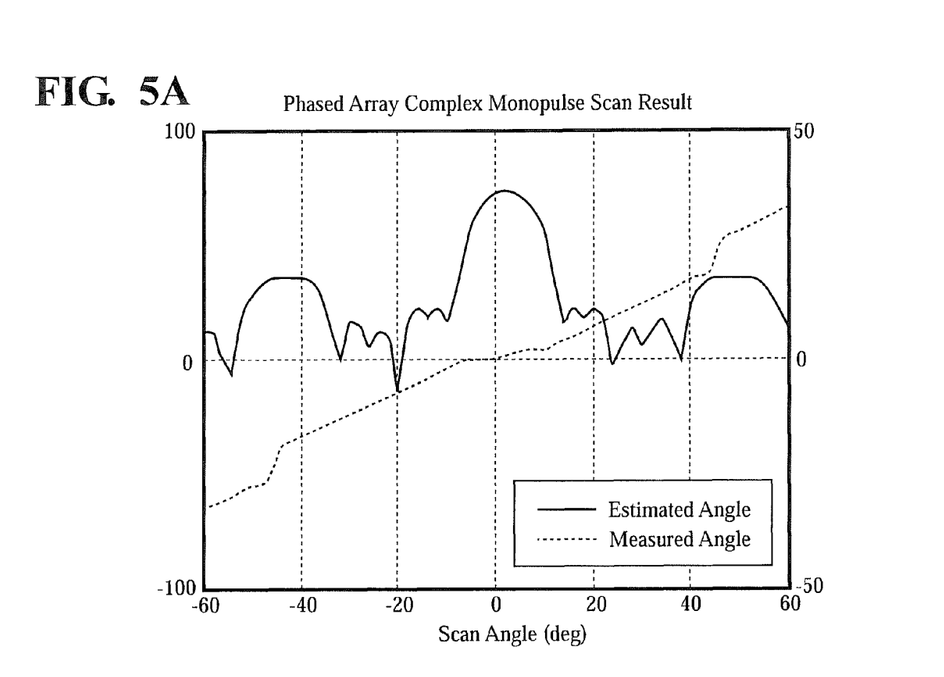
FIG. 5A is an exemplary complex monopulse scan result of the phased array radar system.

The present invention overcomes this deficiency in conventional monopulse radar apparatuses by using a complex amplitude monopulse ratio along with a weighted target angle histogram 90 to discriminate between targets separated by less than the beamwidth of the antenna array beams which would otherwise be interpreted as a single target. When employing the complex amplitude monopulse ratio algorithm, the first and second phased array radar receiver beams 32, 42 sweep from one side of the field of view 80 to the other with a predetermined interval. For example, the sweep may range from −50 degrees to 50 degrees relative to the central transmit axis with a 2 degree interval as shown in FIG. 5A. For each step in the detection sweep, the first and second receive beams 32, 42 and the transmit beam point in the same direction relative to the central transmit axis. In the case where a target 60 is detected by the two receive beams 32, 42, the radar controller 50 calculates the complex amplitude monopulse ratio of the targets. The radar controller 50 then matches the target's complex amplitude monopulse ratio with the pattern's complex monopulse ratio to estimate the target's measurement angle using the following equations:

$$\text{Pattern Complex Monopulse Ratio} = (R2 - R1)/(R2 + R1)$$

$$\text{Target Complex Monopulse Ratio} = (yR2 - yR1)/(yR2 + yR1)$$

where
R1=beamforming response pattern in a certain direction from receiving beam 1;
R2=beamforming response pattern in a certain direction from receiving beam 2;
yR1=detected targets response in a certain direction from receiving beam 1;
yR2=detected targets response in a certain direction from receiving beam 2.

Figure 5B:
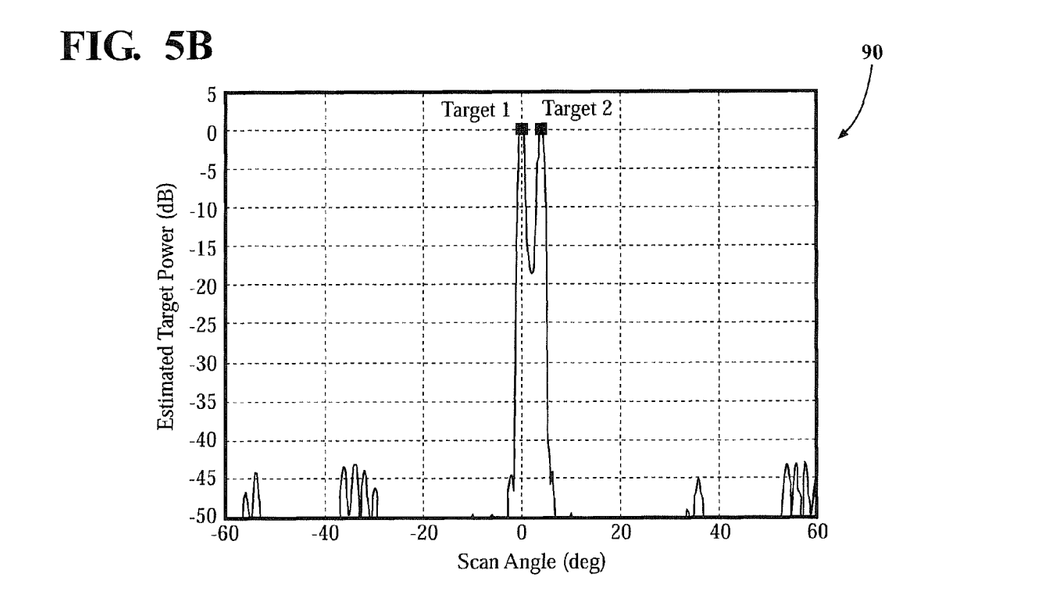
FIG. 5B is an exemplary weighted target angle histogram of the phased array radar system.

The radar controller 50 calculates the complex amplitude monopulse ratio for all the targets 60 detected by the sweep and then uses the estimated target angle information and amplitudes to calculate a weighted target angle histogram 90. The weighted target angle histogram 90 uses angle slope as the weight where the larger the slope, the smaller the weight applied in the histogram 90. A window convolution is then applied to the histogram to group the data and find peaks above a predetermined power threshold. Once grouped, the angles that correspond to the power peaks are the angle measurements of the targets detected by the sweep. In this way, the weighted target angle histogram allows the radar apparatus to distinguish between targets 60 that a conventional monopulse radar system 200 would otherwise detect as a single target 150.

In a general sense, targets 60 are generally detected by the main lobe of a beam because enough power is returned from the target 60 to the two phased array radar receivers 30, 40. In the case where two targets 60 are detected by different beams of a sweep, the complex amplitude monopulse ratio and weighted target angle histogram 90 enable the radar apparatus 10 of the present invention to distinguish between the closely separated targets 60. This form of monopulse angle measurement is precise enough to distinguish between closely separated targets 60 because multiple beams detect the target from different directions.

Figure 6:
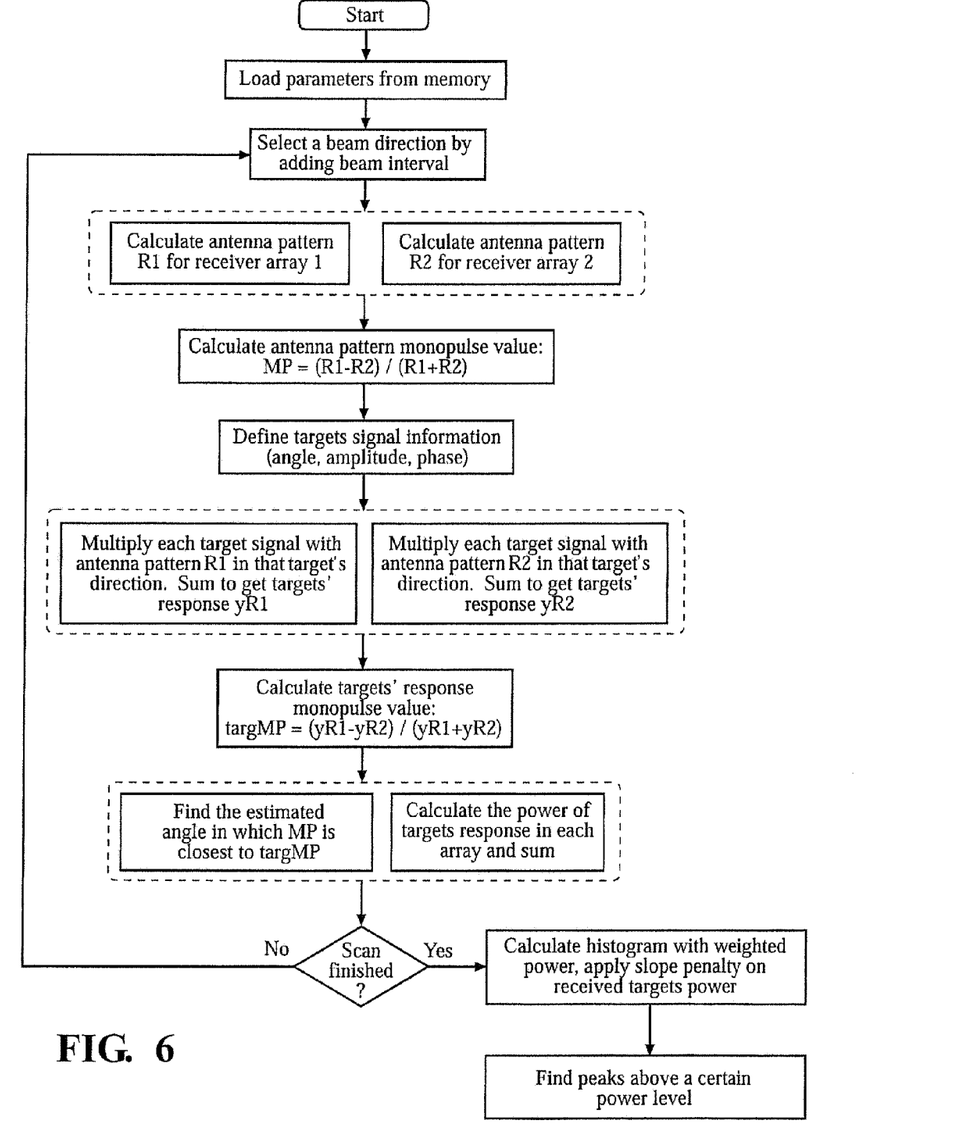
FIG. 6 is a flow chart depicting the complex monopulse algorithm of the phased array radar system.

As described in the flowchart of FIG. 6, after loading the system parameters from memory and determining a beam direction, the radar controller 50 calculates the antenna patterns R1 and R2. The antenna patterns are then used to calculate the antenna pattern monopulse ratio and define target information. Each target signal is multiplied by the antenna patterns R1 and R2 and summed to get the target response yR1 and yR2. The target responses are then used to calculate the target monopulse ratio. The radar controller 50 estimates the angle where the antenna pattern monopulse ratio is closest to the target monopulse ratio and calculates the power of the response in each array and sums the results. The process repeats until the scan is finished and the radar controller 50 computes the histogram 90 with weighted power by applying a slope penalty on the received targets' power. Finally, the histogram 90 is used to find peaks above a predetermined power level which correspond to the target angle information 64.

An improved radar apparatus 10 and method for identifying targets 60 in an environment includes a phased array radar transmitter 20 operable to generate and transmit a transmit beam into the environment, a first phased array radar receiver 30 operable to receive a first beam 32 from the targets, a second phased array radar receiver 40 operable to receive a second receive beam 42 from the targets, and a radar controller 50 operable to steer the transmit beam, the first receive beam 32, and the second receive beam 42. The first and second phased array radar receivers 30, 40 are configured in a receiver arrangement such that the first and second phased array radar receivers 30, 40 have effectively the same configuration. The radar controller 50 has an electronic control unit 52 having a processor 54, a memory 56, and an electronic database 58. The radar controller 50 is further in communication with the phased array radar transmitter 20 and the first and second phased array radar receivers 30, 40. The radar controller 50 uses the first and second receive beams 32, 42 to calculate an amplitude monopulse ratio and identify angle information 64 of the targets 60 within the environment. Improving upon conventional monopulse radar apparatuses, the present invention enables high precision estimation of target angle information while scanning over a wide field of view 80 in a single scan.

In a case where two targets 60 in the environment have similar range and velocity with slightly different angles which are less than the beamwidth from the radar's perspective, the radar apparatus 10 of the present invention uses a complex amplitude monopulse ratio and a weighted target angle histogram 90 to distinguish between closely separated targets that would otherwise be viewed as a single target 150 by conventional monopulse radar systems 200. In this way, the radar apparatus 10 of the present invention enables high precision estimation of a target's angle while maintaining a scan over a wide field of view relative to conventional monopulse radar apparatuses.

The invention is not restricted to the illustrative examples described above. Examples described are not intended to limit the scope of the invention. Changes therein, other combinations of elements, and other applications will occur to those skilled in the art without deviating from the spirit of the described invention.

We claim:

1. A radar apparatus for identifying targets in an environment comprising:
    a phased array radar transmitter, operable to generate and transmit a transmit beam into the environment;
    a first phased array radar receiver configured in a receiver arrangement and operable to receive a first receive beam from the targets, the first receive beam having a first beam detectable area;
    a second phased array radar receiver configured in the receiver arrangement and operable to receive a second receive beam from the targets, the second receive beam having a second beam detectable area; and
    a radar controller having an electronic control unit, the radar controller operable to steer the transmit beam, the first receive beam, and the second receive beam,
    the radar controller using the first and second receive beams to calculate an amplitude monopulse ratio and identify angle information of the targets within both the first and second beam detectable areas.

2. The radar apparatus of claim 1,
    the first phased array radar receiver having a first array of receive antenna elements,
    the second phased array radar receiver having a second array of receive antenna elements,
    each antenna element of the first and second arrays of receive antenna elements having an associated phase shifter.

3. The radar apparatus of claim 2,
    the first array of receive antenna elements configured in an array arrangement, and
    the second array of receive antenna elements configured in the array arrangement.

4. The radar apparatus of claim 2, having at least one RF mixer for each of the first and second arrays of receive antenna elements, the RF mixers and all phase shifters on a single chip.

5. The radar apparatus of claim 1,
    the phased array radar transmitter having an array of transmit antenna elements,
    each antenna element of the array of transmit antenna elements having an associated phase shifter.

6. The radar apparatus of claim 1,
    the transmit beam directed towards the targets at a transmit angle,
    the first receive beam received from the targets at a first receive angle,
    the second receive beam received from the targets at a second receive angle,
    the radar controller using the first and second receive angles to calculate a pattern amplitude monopulse ratio, a target amplitude monopulse ratio, and identify angle information of the targets within both the first and second beam detectable areas.

7. A radar apparatus for identifying targets in an environment comprising:
    a phased array radar transmitter, operable to generate and transmit a plurality of transmit beams into the environment;
    a first phased array radar receiver configured in a receiver arrangement and operable to receive a plurality of first receive beams from the targets, the first receive beams having a first beam detectable area;
    a second phased array radar receiver configured in the receiver arrangement and operable to receive a plurality of second receive beams from the targets, the second receive beams having a second beam detectable area; and
    a radar controller having an electronic control unit, the radar controller operable to steer the plurality of transmit beams, the first receive beams, and the second receive beams,
    the radar controller using the plurality of first and second receive beams to calculate a weighted target angle histogram, a complex amplitude monopulse ratio, and identify angle information of the targets within both the first and second beam detectable areas.

8. The radar apparatus of claim 7,
    the first phased array radar receiver having a first array of receive antenna elements,
    the second phased array radar receiver having a second array of receive antenna elements, each antenna element of the first and second arrays of receive antenna elements having an associated phase shifter.

9. The radar apparatus of claim 8, the first array of receive antenna elements configured in an array arrangement, and the second array of receive antenna elements configured in the array arrangement.

10. The radar apparatus of claim 8, having at least one RF mixer for each of the first and second arrays of receive antenna elements, the RF mixers and all phase shifters on a single chip.

11. The radar apparatus of claim 7, the phased array radar transmitter having an array of transmit antenna elements, each antenna element of the array of transmit antenna elements having an associated phase shifter.

12. The radar apparatus of claim 7,
the transmit beam directed towards the targets at a transmit angle, the transmit beam and transmit angle sweeping over a detectable range,
the first receive beam received from at a first receive angle,
the second receive beam received from at a second receive angle,
the radar controller using the first and second receive angles to calculate a complex pattern amplitude monopulse ratio, a complex target amplitude monopulse ratio, the weighted target angle histogram, and identify angle information of the targets within the detectable range.

13. A method for controlling a radar apparatus for detecting targets in an environment comprising:
providing a phased array radar transmitter, operable to generate and transmit a transmit beam into the environment;
providing a first phased array radar receiver configured in a receiver arrangement and operable to receive a first receive beam having a first beam detectable area;
providing a second phased array radar receiver configured in the receiver arrangement and operable to receive a second receive beam having a second beam detectable area; and
providing a radar controller having an electronic control unit, the radar controller operable to steer the transmit beam, the first receive beam, and the second receive beam,
calculating, by the radar controller, an amplitude monopulse ratio using the first and second receive beams,
calculating, by the radar controller, angle information of the targets within both the first and second beam detectable areas using the amplitude monopulse ratio.

14. The method of claim 13, further comprising:
the transmit beam is directed towards the targets at a transmit angle,
the first receive beam is received at a first receive angle,
the second receive beam is received at a second receive angle, and
calculating, by the radar controller, a pattern amplitude monopulse ratio and a target amplitude monopulse ratio using the first and second receive angles,
calculating, by the radar controller, angle information of the targets within both the first and second beam detectable areas using the pattern amplitude monopulse ratio and the target amplitude monopulse ratio.

15. The method of claim 14, further comprising:
the phased array radar transmitter transmitting a plurality of transmit beams;
the first phased array radar receiver receiving a plurality of first receive beams having a first beam detectable area;
the second phased array radar receiver receiving a plurality of second receive beams, and
calculating, by the radar controller, a weighted target angle histogram and a complex amplitude monopulse ratio using the plurality of first and second receive beams,
calculating, by the radar controller, angle information of the targets within both the first and second beam detectable areas using the weighted target angle histogram and the complex amplitude monopulse ratio.

16. The method of claim 15, further comprising:
the transmit beam directed towards the targets at a transmit angle, the transmit beam and transmit angle sweeping over a detectable range,
the first receive beam received at a first receive angle,
the second receive beam received at a second receive angle, and
calculating, by the radar controller, a complex pattern amplitude monopulse ratio, a complex target amplitude monopulse ratio, and the weighted target angle histogram using the first and second receive angles,
calculating, by the radar controller, angle information of the targets within the detectable range using the complex pattern amplitude monopulse ratio, the complex target amplitude monopulse ratio, and the weighted target angle histogram.

* * * * *